(12) United States Patent
Tan et al.

(10) Patent No.: US 7,582,719 B1
(45) Date of Patent: Sep. 1, 2009

(54) CARBOXYLIC-ACID-TERMINATED HYPERBRANCHED POLY(BENZOXAZOLE) AND THE STAR BLOCK COPOLYMERS THEREFROM

(75) Inventors: Loon-Seng Tan, Centerville, OH (US); Jong-Beom Baek, Chungbuk (KR)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 636 days.

(21) Appl. No.: 11/193,990

(22) Filed: Jul. 28, 2005

Related U.S. Application Data

(60) Provisional application No. 60/599,299, filed on Jul. 30, 2004.

(51) Int. Cl.
*C08G 63/06* (2006.01)
*C08G 63/12* (2006.01)
*C08G 73/06* (2006.01)

(52) U.S. Cl. .................. 528/185; 528/208; 528/423

(58) Field of Classification Search .................. 528/208, 528/423, 185
See application file for complete search history.

(56) References Cited

U.S. PATENT DOCUMENTS

| | | | |
|---|---|---|---|
| 4,125,725 A | 11/1978 | Duffy | |
| 4,868,271 A * | 9/1989 | Dahl et al. | 528/171 |
| 5,030,704 A | 7/1991 | Harris et al. | |
| 5,194,519 A | 3/1993 | Dotrong et al. | |
| 5,264,504 A | 11/1993 | Evers et al. | |
| 6,608,171 B1 * | 8/2003 | Tan et al. | 528/423 |
| 6,974,857 B1 * | 12/2005 | Baek et al. | 528/423 |

OTHER PUBLICATIONS

J.B. Baek et al., "Carboxylic Acid-Terminated Hyperbranched Polybenzoxazole (PBO) and its Star Block Copolymers", *Polymer Preprints*, 2003, vol. 44(2), pp. 832-833.
Shanfeng Wang et al., "Viscometric Study on the Interactions of Polymers of the Poly(benzazole) Family with Nylon 66", *European Polymer Journal*, 2000, vol. 36(9), pp. 1843-1852.
M. Dotrong et al., "Graft Copolymers of Rigid-Rod Polymers as Single-Component Molecular Composites", *Polymer*, 1993, vol. 34(4), pp. 726-730.
U.M. Vakil et al., "Influence of Molecular Structure on Processing Conditions and Mechanical Properties of Graft Rigid-Rod Copolymers", *Polymer*, 1993, vol. 34(4), pp. 731-735.

* cited by examiner

*Primary Examiner*—Nathan M Nutter
(74) *Attorney, Agent, or Firm*—AFMCLO/JAZ; Bart S. Hersko

(57) ABSTRACT

Hyperbranched benzazole polymers having repeating units of the formula:

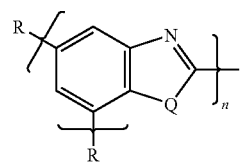

wherein Q is —O—, —S— or —NH—, and the terminal groups R are carboxylic acids with their total number equals n+1. A generic method for preparing the polymers is provided. Also provided are the star block copolymers derived from these hyperbranched benzazole polymers and linear poly(ether-ketones) having the following generic formula

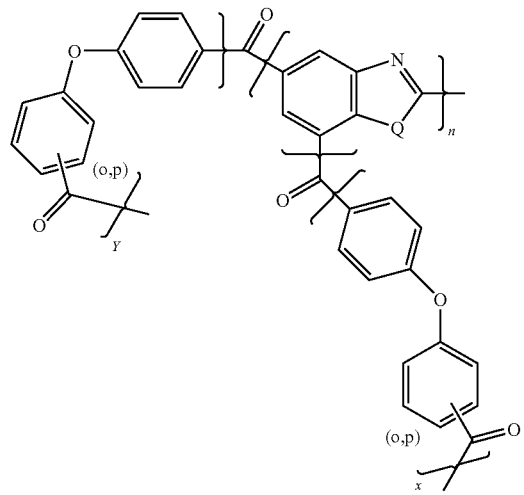

where x and y are the numbers of repeat units for each poly (ether-ketone) chain; the placement of the carbonyl moieties in the repeat units of the poly(ether-ketone) chains can be either meta or para to the phenoxy groups; the maximal number of poly(ether-ketone) chains is n+1, where n=number of repeat units for hyperbranched polybenzazole). A general method for synthesizing these star block copolymers is provided.

2 Claims, No Drawings

CARBOXYLIC-ACID-TERMINATED HYPERBRANCHED POLY(BENZOXAZOLE) AND THE STAR BLOCK COPOLYMERS THEREFROM

CROSS REFERENCE TO RELATED APPLICATION

This application claims priority of the filing date of Provisional Application Ser. No. 60/599,299, filed Jul. 30, 2004.

RIGHTS OF THE GOVERNMENT

The invention described herein may be manufactured and used by or for the Government of the United States for all governmental purposes without the payment of any royalty.

BACKGROUND OF THE INVENTION

The present invention relates to a new hyperbranched benzoxazole polymer and its star-block copolymers with poly (ether-ketones).

Dendritic macromolecules such as dendrimers and hyperbranched polymers are a new class of highly branched polymers that have distinctly different properties from their linear analogs. Both dendrimers and hyperbranched polymers have much lower solution and melt viscosities than their linear analogs of similar molecular weights. They also have a large number of chain-ends whose collective influence dictates their overall physical and/or chemical behaviors. These features are attractive in terms of processability and offering flexibility in engineering required properties for specific applications. However, there is a practical advantage that hyperbranched polymers have over dendrimers at "raw material" level. Although dendrimers have precisely controlled structures (designated as generations), their preparations generally involve tedious, multi-step sequences that are impractical and costly in scale-up production. Synthesis of a hyperbranched polymer, on the other hand, is a one-pot process. Large quantities of hyperbranched polymers can be easily produced from $AB_x$ ($x \geq 2$) monomers.

Because of their excellent thermal and mechanical properties, as well as their optical and electronic characteristics, aromatic, fused heterocyclic polymers such as poly(benzoxazoles), poly(benzothiazoles) and poly(benzimidazolos) continue to attract considerable attention. However, they have limited processability due to the nature of fused ring systems. Their insolubility and their softening temperatures are generally above their degradation temperatures. Chemical modification on these materials, for example, by the use of solubilizing pendants or flexible units in the main chain, has been successful to improve their processability, allowing the optimization of their properties as a function of processability. Another viable approach to achieving this objective is to incorporate the elements of local rigidity and global randomness into the macromolecular architecture. Local rigidity provides the thermal, electronic and optical characteristics of the aromatic fused systems while global randomness frustrates entanglement of the polymer chains, leading to greater solubility. Dendritic structures clearly embody these qualities. However, as noted previously, hyperbranched structures have greater synthetic practicality in terms of the production cost.

Accordingly, it is an object of the present invention to provide a novel carboxylic acid-terminated hyperbranched benzoxazole polymer.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided hyperbranched benzazole polymers having repeating units of the formula:

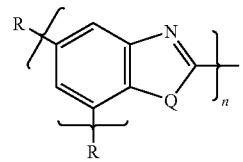

wherein Q is —O—, —S— or —NH—; and the terminal groups R are carboxylic acids with their total number equals n+1.

Also provided are the star block copolymers derived from these hyperbranched benzazole polymers and linear poly (ether-ketones) having the following generic formula

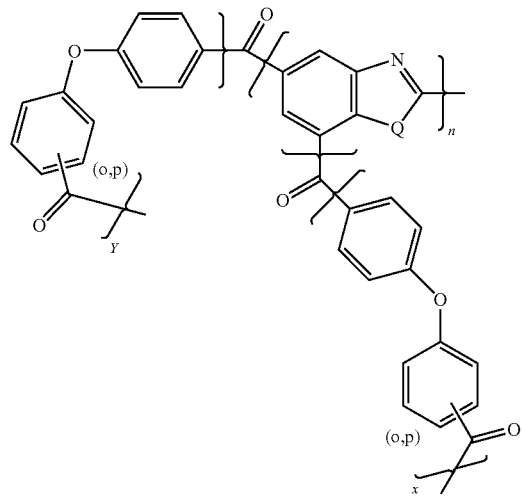

where x and y are the numbers of repeat units for each poly(ether-ketone) chain; the placement of the carbonyl moieties in the repeat units of the poly(ether-ketone) chains can be either meta or para to the phenoxy groups; the maximal number of poly(ether-ketone) chains is n+1, where n=number of repeat units for hyperbranched poly(benzazole). A general method for synthesizing these star block copolymers is provided.

DETAILED DESCRIPTION OF THE INVENTION

The $CO_2H$-terminated hyperbranched benzazole polymers of this invention are prepared by polymerization of the corresponding $AB_2$ monomer

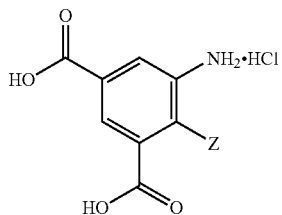

wherein Z is —OH, —SH or —NH₂HCl.

Briefly, the AB₂ monomer, 5-amino-4-hydroxyisophthalic acid hydrochloride, was synthesized via acid promoted hydrolysis of dimethyl 5-amino-4-hydroxyisophthalate, which was prepared by the catalytic reduction of dimethyl 4-hydroxy-5-nitroisophthalate with hydrogen gas. Dimethyl 4-hydroxy-5-nitroisophthalate was synthesized by the nitration of dimethyl 4-hydroxyisophthalate with a mixture of nitric acid and acetic acid. dimethyl 4-hydroxyisophthalate was prepared by first converting 4-hydroxyisophthalic acid with the aid of thionyl chloride to the corresponding bis(acid chloride) intermediate, immediately followed by treatment of the bis(acid chloride) with methanol. All intermediates and monomer were confirmed with the conventional techniques such as melting point, proton and carbon nuclear magnetic resonance spectroscopy ($^1$H— and $^{13}$C-NMR), FT-IR (KBr), elemental, mass, and HPLC analyses.

The AB₂ monomer, 4,5-diaminoisophthalic acid hydrochloride is synthesized in similar fashion, starting with dimethyl 5-nitroisophthalate which is first acetylated to protect the amino group, followed by nitration, chemical reduction and deprotection of the amino group and demethylation of the carboxylic acid groups to provide the desired monomer.

The AB₂ monomer, 4-mercapto-5-aminoisophthalic acid hydrochloride, is synthesized in similar fashion, starting with catalytic hydrogenation of dimethyl 5-nitroisophthalate to form the corresponding amine, dimethyl-5-aminoisophthalate, which is then acetylated to protect the amino group. Dimethyl-5-aminoisophthalate is treated with thiocyanogen bromide (generated in-situ from bromine and ammonium thiocynate), and finally hydrolyzed to provide the desired monomer.

Polymerization of the AB₂ monomer can be conducted in polyphosphoric acid (PPA) at a polymer concentration of about 6 weight percent at a temperature of about 120° to 150° C., or in the melt state.

Due to the availability of large number of carboxylic acid end groups of the hyperbranched poly(benzoxazoles), star-branched block copolymerization can be utilized to tailor their physical properties for various applications. The number of available reactive carboxylic acid end-groups is equal to the degree of polymerization plus one (D)P+1). Thus, AB monomers for polyetherketones, including but not limited to, 3-phenoxybenzoic acid and 4-phenoxybenzoic acid, were incorporated onto the parent hyperbranched poly(benzoxazole) by grafting via in-situ polymerization of either AB monomers in polyphosphoric acid. The star block copolymers derived from these hyperbranched benzazole polymers and linear poly(ether-ketones) are represented by the following generic formula:

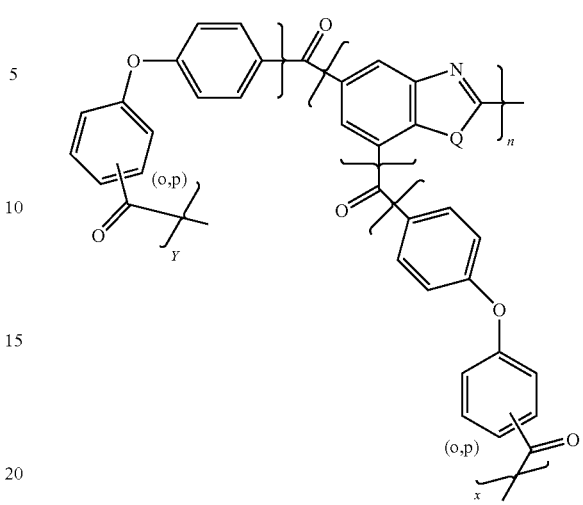

where x and y are the numbers of repeat units for each poly(ether-ketone) chain; the placement of the carbonyl moieties in the repeat units of the poly(ether-ketone) chains can be either meta or para to the phenoxy groups; the maximal number of poly(ether-ketone) chains is n+1, where n=number of repeat units for hyperbranched poly(benzazole). Preferably, the degree of polymerization for the parent hyperbranched poly(benzoxazole) is in the range $5 \leq n \leq 1000$, more preferably $5 \leq n \leq 100$. The molecular weight of the poly(ether-ketone) chains can be controlled by the amount of respective AB-monomer used in the graft-polymerization. Preferably, $100 \leq +y \leq 1000$. As illustrated in the examples 6 and 7, copolymerization with either 4-phenoxybenzoic acid or 3-phenoxybenzoic acid in polyphosphoric acid can result in a star block copolymer with para-poly(ether-ketone) as the linear chains represented by the following structural formula:

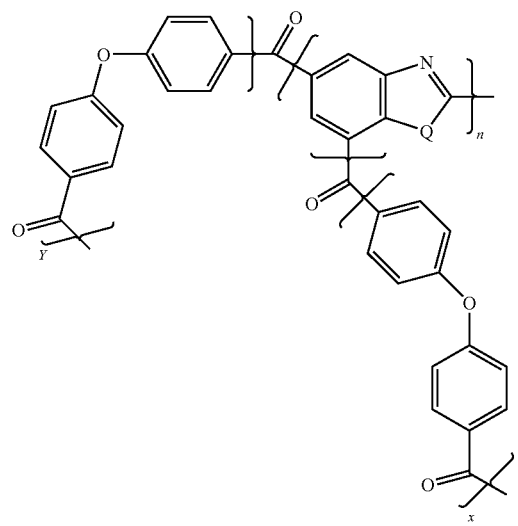

or with meta-poly(ether-ketone) as the linear chains represented by the following structural formula:

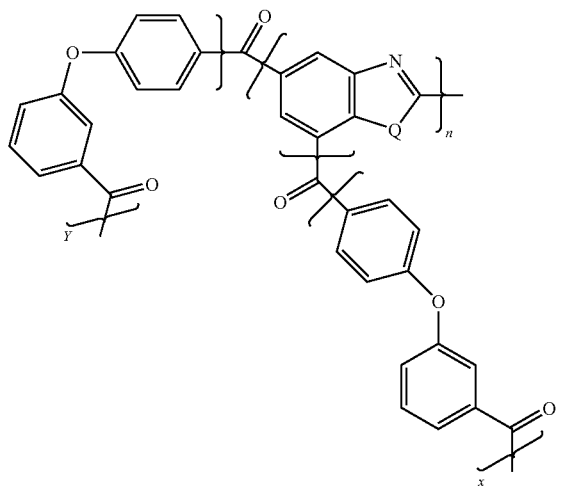

Apart from conducting the copolymerization in a batch process, as obvious to those skilled in the art, it can also be conducted in a continuous "one-pot reaction" mode.

The resulting copolymers had higher solution viscosities than that of the parent hyperbranched poly(benzoxazole). Although the molecular architecture has been changed, the total number of carboxylic acids on the block copolymer should remain the same as that of the core. However, for the block copolymers, it is expected that the nature of the polymer backbone (repeat units) should play a more important role in determining the overall physical and mechanical properties.

The following examples illustrate the invention:

Example 1

Dimethyl 4-hydroxyisophthalate

Into a 250 mL three-necked round bottom flask equipped with a magnetic stirrer, a condenser, and dropping funnel, a solution of 4-hydroxyisophthalic acid (15.0 g, 82.4 mmol) in 150 mL of dried methanol was charged. Freshly distilled thionyl chloride (75.0 g, 630.5 mmol) was then added dropwise for 30 min. The mixture was gently heated under reflux for 4 h. Upon cooling to room temperature, white flakes formed, and were collected by suction filtration to give 16.3 g. (94% yield): mp 93-94° C.: Anal. Calcd. for $C_{10}H_{10}O_5$: C, 57.14%; H, 4.80%; O, 38.06%: Found: C, 56.89%; H, 4.72%; O, 38.15%. FT-IR (KBr, $cm^{-1}$): 3416, 3211, 2964, 1733, 1689. Mass spectrum (m/e): 210($M^+$, 100% relative abundance) 179, 151. $^1$H-NMR (CDCl$_3$, ppm) δ 3.90 (s, 3H, CH$_3$), 3.98 (s, 3H, CH$_3$), 6.98-7.01 (d, 1H, Ar), 8.08-8.12 (dd, 1H, Ar), 8.53-8.54 (d, 1H, Ar), 11.19 (s, 1H, OH). $^{13}$C-NMR (CDCl$_3$, ppm) δ 52.09, 52.61, 112.14, 117.78, 121.44, 132.47, 136.58, 165.09, 165.99, 170.10.

Example 2

Dimethyl 4-hydroxy-5-nitroisophthalate

Into a 250 mL three-necked round-bottom flask equipped with a magnetic stirrer, a condenser, and nitrogen inlet, dimethyl 4-hydroxyisophthalate (15.0 g, 71.4 mmol) was dissolved in acetic acid (150 mL). Nitric acid (10 ml) was then added dropwise. The mixture was warmed at 60° C. for 12 h. Then, the cool mixture was poured into water. The light yellow precipitate was collected, air-dried and recrystallized from ethanol to give 16.0 g (88% yield) of light yellow crystals: mp=74-76° C. Anal. Calcd. for $C_{10}H_9NO_7$: C, 47.07%; H, 3.55%; N, 5.49%; O, 43.89%. Found: C, 47.75%; H, 4.01%; N, 5.44%; O, 43.51%: FT-IR (KBr, $cm^{-1}$): 3076, 2992, 1722, 1690. Mass spectrum (m/e): 255 ($M^+$, 100% relative abundance), 241, 237. $^1$H-NMR (DMSO-d$_6$, ppm) δ 3.89 (s, 3H, CH$_3$), 3.97 (s, 3H, CH$_3$), 8.46-8.47 (d, 1H, Ar), 8.55-8.56 (d, 1H, Ar). $^{13}$C-NMR (CDCl$_3$, ppm) δ 52.72, 53.38, 117.60, 120.19, 130.61, 135.31, 138.50, 156.13, 163.70, 166.87.

Example 3

Dimethyl 5-amino-4-hydroxyisophthalate

Into a 500 mL high pressure bottle, dimethyl 4-hydroxy-5-nitroisophthalate (15.0 g, 58.8 mmol), palladium on activated carbon (10%, 1.0 g), and acetic acid (200 mL) were charged. The bottle was placed a hydrogenator. Hydrogen was charged and discharged five times and the bottle was then agitated at 60-65 psi for 24 h. After the reaction mixture had been filtered through Celite 545 to remove catalyst, the solvent was removed from the filtrate on a rotavap. The orange residue was recrystallized from deoxygenated ethanol to give 12.1 g (91% yield) of brown needles: mp=205° C. (free amine, dec.), 335° C. (hydrochloric acid salt, dec.): mp 161-163° C.: Anal. Calcd. for $C_{10}H_{11}NO_5$: C, 53.33%; H, 4.92%; N, 6.22%, O, 35.52%: Found: C, 53.40%; H, 4.88%; N, 5.92%, O, 35.57. FT-IR (KBr, $cm^{-1}$): 3484, 3384, 2966, 1707, 1668. Mass spectrum (m/e): 225 ($M^+$, 100% relative abundance), 193, 165, 162. $^1$H NMR (DMSO-d$_6$, ppm) δ 3.91 (s, 3H, CH$_3$), 3.99 (s, 3H, CH$_3$), 8.20-8.22 (d, 1H, Ar), 8.29-8.30 (d, 1H, Ar), 9.90 (NH, and OH). $^{13}$C-NMR (DMSO-d$_6$, ppm) δ 52.63, 53.33, 114.02, 121.07, 123.06, 128.23, 129.45, 157.51, 165.63, 170.72.

Example 4

5-amino-4-hydroxyisophthalic Acid Hydrochloride

Into a 250 mL three-necked round-bottom flask equipped with a magnetic stirrer, nitrogen inlet, and a condenser, dimethyl 5-amino-4-hydroxyisophthalate (11.0 g, 48.8 mmol) and concentrated hydrochloric acid (200 mL) were placed. The mixture was then heated under reflux with vigorous stirring until the solution became homogeneous. It took about 6 h. While the mixture was cooling down, white flakes were formed and collected by suction filtration and dried under the reduced pressure to give 7.1 g (74% yield) of off-white crystals: mp>300° C. (dec.): Anal. Calcd. for $C_8H_8ClNO_5$: C, 41.13%; H, 3.45%; Cl, 15.18%; N, 6.00%; O, 34.24%: Found: C, 40.81%; H, 3.40%; Cl, 15.26%; N, 5.56%; O, 33.50%. FT-IR (KBr, $cm^{-1}$): 1684 (carboxy carbonyl), 2580, 2892 (COOH), 3406 (NH), 3396 (OH). Mass spectrum (m/e): 197 ($M^+$, 100% relative abundance). $^1$H-NMR (DMSO-d$_6$, ppm) δ 8.21-8.22 (d, 1H, Ar), 8.30-8.31 (d, 1H, Ar), 9.91 (broad s, COOH, NH, and OH). $^{13}$C-NMR (DMSO-d$_6$, ppm) δ 114.01, 121.01, 123.05, 128.26, 129.47, 157.52, 165.64, 170.74.

Example 5

Hyperbranched Polybenzoxazole

Into a 250 mL resin flask equipped with a high torque mechanical stirrer, nitrogen inlet and outlet, polyphosphoric acid (PPA, 60 g) was placed and stirred with dry nitrogen purging for 10 h. The monomer, 5-amino-4-hydroxyisophthalic acid hydrochloride (1.5 g, 6.4 mmol) was added and the resulting mixture was dehydrochlorinated under reduced pressure (1 mmHg) at 60° C. for 24 h, 100° C. for 24 h, and 130° C. Upon completion of the dehydrochlorination, the mixture was gently heated to 160° C. for 4 h. When the temperature was approach 160° C., the mixture became viscous and was heated to 185° C. for 24 h. At the end of the reaction, water was added into the flask and poured into a Waring blender and the polymer "bundles" were chopped, collected by suction filtration, washed with diluted ammonium hydroxide and then Soxhlet extracted with water for 3 days and methanol for 3 days, and finally dried under reduced pressure (1 mmHg) at 150° C. for 48 h. An intrinsic viscosity of 0.57 dL/g (MSA, 30±0.1° C.) was determined: Anal. Calcd. for $C_8H_3NO_3$: C, 59.64%; H, 1.88%; N, 8.69%; O, 29.79%. Found: C, 53.86%; H, 2.73%; N, 7.65%; O, 33.74%.

Example 6

Star Block Copolymer of Hyperbranched poly(benzoxazole)-linear meta-poly(ether-ketone)

Into a 100 mL resin flask equipped with a high torque mechanical stirrer, nitrogen inlet and outlet, hyperbranched poly(benzoxazole) (example 5; 0.10 g, 0.62 mmol) and PPA (20 g) were placed. The mixture was heated to 130° C. and stirred 8 h until the mixture become homogeneous. The AB monomer, 3-phenoxybenzoic acid (1.0 g, 4.67 mmol) and $P_2O_5$ (5.0 g) were added. The temperature was maintained at 130° C. for 48 h. At the end of the reaction, water was added into the flask and poured into a Waring blender and the polymer bundles were chopped, collected by suction filtration, washed with diluted ammonium hydroxide and then Soxhlet extracted with water for 3 days and methanol for 3 days, and finally dried under reduced pressure (1 mmHg) at 150° C. for 48 h. An intrinsic viscosity of 1.65 dL/g (MSA, 30±0.1° C.) was determined: Anal. Calcd. for $C_{12.41}H_{7.41}N_{0.12}O_{2.12}$: C, 77.23%; H, 3.85%; N, 1.02%; O, 17.89%. Found: C, 76.14%; H, 4.20%; N, 0.79%; O, 17.67%.

Example 7

Star Block Copolymer of Hyperbranched poly(benzoxazole)-linear para-poly(ether-ketone)

Into a 100 mL resin flask equipped with a high torque mechanical stirrer, nitrogen inlet and outlet, hyperbranched poly(benzoxazole) (example 5; 0.10 g, 0.62 mmol) and PPA (20 g) were placed. The mixture was heated to 130° C. and stirred 8 h until the mixture become homogeneous. The AB monomer, 4-phenoxybenzoic acid (1.0 g, 4.67 mmol) and $P_2O_5$ (5.0 g) were added. The temperature was maintained at 130° C. for 48 h. At the end of the reaction, the reaction mixture was poured into water. The fibrous product was collected by suction filtration, washed with diluted ammonium hydroxide and then Soxhlet extracted with water for 3 days and methanol for 3 days, and finally dried under reduced pressure (1 mmHg) at 150° C. for 48 h. An intrinsic viscosity of 0.88 dL/g (MSA, 30±0.1° C.) was determined. Anal. Calcd. for $C_{12.41}H_{7.41}N_{0.12}O_{2.12}$: C, 77.23%; H, 3.85%; N, 1.02%; O, 17.89%. Found: C, 75.48%; H, 4.22%; N, 0.83%; O, 18.02%.

We claim:

1. A star-block having the following formula:

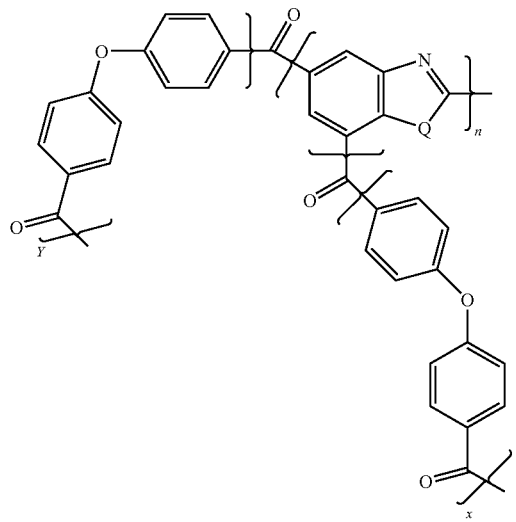

wherein Q is —O—, —S— or —NH—; where x and y are the numbers of repeat units for each poly(ether-ketone) chain, wherein $100 \leq x+y \leq 1000$; the maximal number of poly(ether-ketone) chains is n+1, where n=number of repeat units for hyperbranched poly(benzazole), wherein $5 \leq n \leq 1000$.

2. A star-block having the following formula:

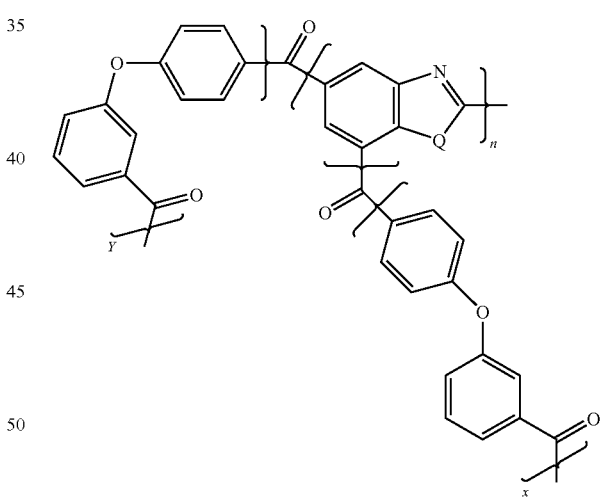

wherein Q is —O—, —S— or —NH—; where x and y are the numbers of repeat units for each meta-poly(ether-ketone) chain; wherein $100 \geq x+y \geq 1000$; the maximal number of poly(ether-ketone) chains is n+1, where n=number of repeat units for hyperbranched poly(benzazole), wherein $5 \geq n \geq 1000$.

* * * * *